Oct. 3, 1939.　　　G. H. HUTAFF, JR　　　2,174,725
WATER AND FEED DEVICE
Filed Nov. 4, 1937
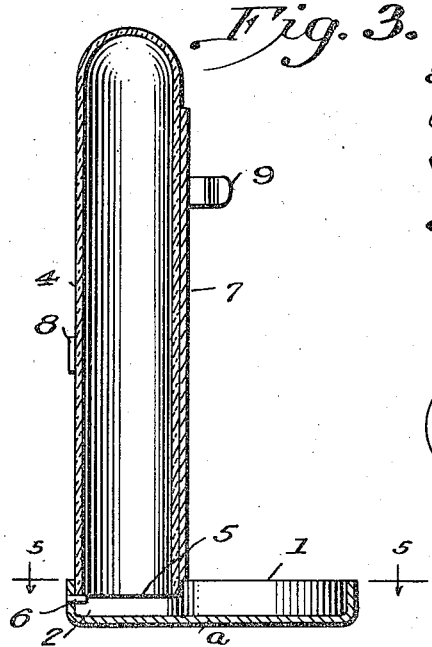
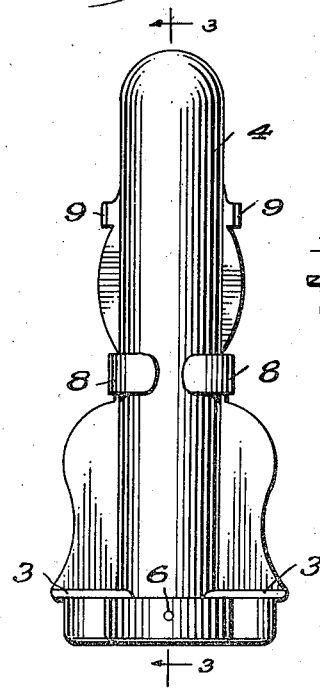
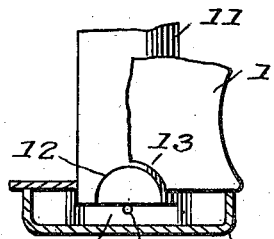
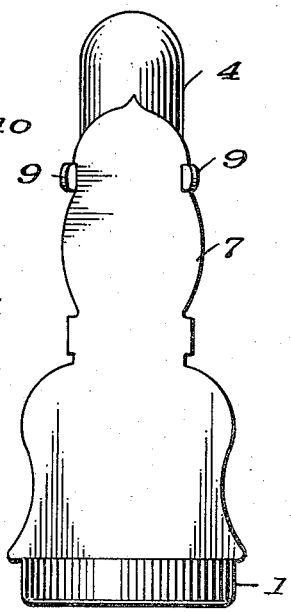
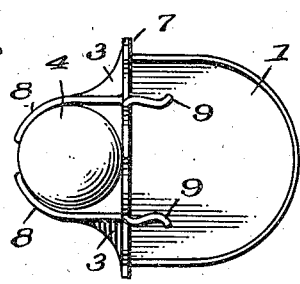
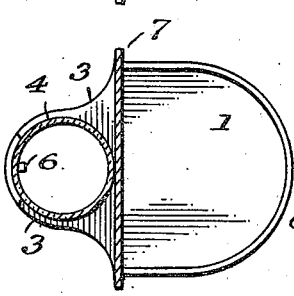
Inventor
GEORGE H. HUTAFF, JR.
By Milans & Milans
Attorneys Patented Oct. 3, 1939

2,174,725

UNITED STATES PATENT OFFICE 2,174,725

WATER AND FEED DEVICE

George H. Hutaff, Jr., Wilmington, N. C.

Application November 4, 1937, Serial No. 172,796

1 Claim. (Cl. 119—18)

My invention relates to new and useful improvements in a water and feed device and while primarily intended for attachment to a bird cage or the like for supplying water or feed to a bird or birds confined within the cage may equally well be used for other purposes.

The principal object of the invention resides in the provision of a device of the character described which may be easily connected to a bird cage or similar object and embodying a readily removable reservoir to receive the water or feed and to be positioned to discharge the water or feed into a trough or pan and to maintain the same at a constant level.

Another object of the invention consists in forming the device with a trough or pan divided into two portions, one portion adapted to receive the lower open end of the reservoir while the other portion is adapted to hold the water or feed in proper position to be consumed by the bird or animals to be fed.

A still further object of the invention resides in the provision of a device of the character described in which a pan or trough is provided, a wall or partition extending upwardly from said pan or trough and provided on one face with means for engaging and supporting the reservoir, which contains the water or feed, while on its other face it is provided with members adapted to engage the cage or other object to which the device is to be attached.

With the above and other object in view, which will appear as the description proceeds, my invention consists in the novel details of construction, and arrangement of parts, described in the following specification and illustrated in the accompanying drawing, and while I have illustrated and described the preferred embodiments of the invention, as they now appear to me, it will be understood that such changes may be made as will fall within the scope of the appended claim.

In the drawing:

Fig. 1 is an elevation of that face of the device which extends outwardly from the cage or other support, the reservoir shown being primarily intended for holding water.

Fig. 2 is an elevation of the opposite face of the device having a pan or trough portion which extends into the cage or other support.

Fig. 3 is a vertical section on the line 3—3 of Fig. 1 looking in the direction of the arrows.

Fig. 4 is a top plan.

Fig. 5 is a horizontal section on the line 5—5 of Fig. 3 looking in the direction of the arrows; and Fig. 6 is a fragmentary sectional view, with parts shown in elevation, of a slightly modified form of the device primarily intended for holding feed as distinguished from water.

In Figs. 1 to 5 inclusive of the drawing I have shown my device as primarily intended for holding water as distinguished from granular feed and in this form of the device the trough or pan indicated generally at $a$ is provided with the relatively wide portion 1 and the smaller portion 2, the smaller portion 2 having the overlying top portions 3 cooperating with the upwardly directed flange of the smaller portion 2 to provide a circular opening to receive the lower end of the reservoir 4, of the shape shown quite clearly in Figs. 1 and 3 of the drawing, and in the instance shown being of glass although it will be understood that the same may equally well be made of other material. The lower end of the reservoir is open as shown at 5, while the top portion is closed. The downward movement of the reservoir is limited by the inwardly directed horizontal pin 6 which will engage the bottom edge of the reservoir as shown more particularly in Fig. 3 of the drawing.

Extending upwardly from the pan or trough $a$, at a point where the portion 1 communicates with the portion 2, is a plate or partition 7 which has the curved arms 8 extending from that face positioned adjacent the reservoir 4, these arms being curved to partly encircle the reservoir as shown more particularly in Figs. 1 and 4 of the drawing. These arms extend partially around the reservoir intermediate the ends thereof and will hold the same against movement relative thereto.

Extending from the opposite face of the plate or partition 7, adjacent the upper end thereof, are the relatively short arms 9 which are adapted to be engaged with wires or bars of the cage or other support, these arms 9, as shown more particularly in Fig. 4 of the drawing, being curved to receive the wires or bars against their outer faces.

It is thought that the manner of use will be clearly understood. When it is desired to place water in the reservoir 4 the same is removed by drawing upwardly to disengage the lower end thereof from the opening in the portion 2 of the trough or pan and also to withdraw from engagement with the arms 8. The position of the reservoir will be reversed to receive the water and then while still held in the reversed position the reservoir will be engaged with the arms 8 and then slid relative to the plate 7 so that the open end will again be received in the opening of the portion 2. Then the position of the whole device may be reversed and water will feed from the lower open end of the reservoir into the portion 1, it being understood, of course, that the portion 1 communicates with the portion 2 as is quite clearly illustrated in the drawing. The portion 1 will be passed through an opening in the cage or other support in position so that the bird or animal may feed therefrom and the arms 9 will be engaged with the wires or bars of the cage. When so positioned it will be understood that the reservoir is positioned outside of the cage or other support.

In Fig. 6 of the drawing I have illustrated a slightly modified form of the invention more particularly adapted for feed of granular form as distinguished from water and as it will be appreciated that such granular feed will not flow as readily as water I have provided means whereby the granular feed not only will be fed downwardly but forwardly into the portion 1 of the pan or trough. The pan or trough in this modified form of the invention is of the same construction as disclosed in Figs. 1 to 5 inclusive of the drawing but a slight change has been made in the vertically extending plate or partition as well as the reservoir. In this modified form, as disclosed in Fig. 6, the vertically extending plate or partition is shown at 10 and the reservoir for the granular feed is shown at 11. The reservoir 11 is supported in the same manner as described for the form shown in Figs. 1 to 5 inclusive and is connected to the plate 10 by means of arms corresponding to the arms 8. At the same time the plate 10 will be provided with arms corresponding to the arms 9 whereby the device may be connected to the bird cage or other support. The reservoir 11 is provided at its lower end, facing the portion 1 of the pan or trough, with the semi-circular cut-out portion 12 and the plate or partition 10 is provided with a similar cut-out portion shown at 13, the edge of which extends on an arc somewhat above the arc of the cut-out portion 12. It will readily be appreciated that the granular feed, contained in the reservoir 11, will be fed downwardly into the pan or trough and by providing the cut-out portions 12 and 13 a certain amount of the feed will be fed forwardly into the portion 1 of the trough or pan in position to be consumed by the bird or animal. With the exception of the cut-out portions 12 and 13 the form of the invention shown in Fig. 6 is similar in all respects to the form of the invention shown in Figs. 1 to 5 inclusive. While, as stated, the form of the invention shown in Figs. 1 to 5 inclusive is primarily intended for supplying water it will be understood that feed of granular form could be used in this form and the same would be fed below the edge of the reservoir and the edge of the vertically extending plate or partition in position to be reached by the consumer, but it is believed that the form of the invention shown in Fig. 6 will be more readily adapted for granular feed in that the same will be fed further into the portion 1 of the pan or trough.

Having fully described my invention what I claim as new and desire to secure by Letters Patent is:

A water and feed device adapted to be removably connected to a bird cage or similarly constructed support having vertically extending bars including a pan having communicating portions, a plate forming a part of the pan and extending upwardly therefrom at the juncture of the communicating portions and adapted to be positioned exteriorly of and parallel with the vertical bars of the cage, a reservoir positioned to extend parallel with and in contact with the outer face of the plate with its lower end extending into one portion of the pan, means for positioning the lower end of the reservoir in spaced relation with the bottom of the pan, arms extending from the outer face of the plate and adapted to partially surround and detachably connect the reservoir to the plate, and relatively short arms extending from the inner face of the plate and adapted for engaging vertically extending bars of the bird cage or similar support for detachably connecting the device thereto, the portion of the pan projecting from the inner face of the plate extending into the bird cage or similar support.

GEORGE H. HUTAFF, Jr.